UNITED STATES PATENT OFFICE.

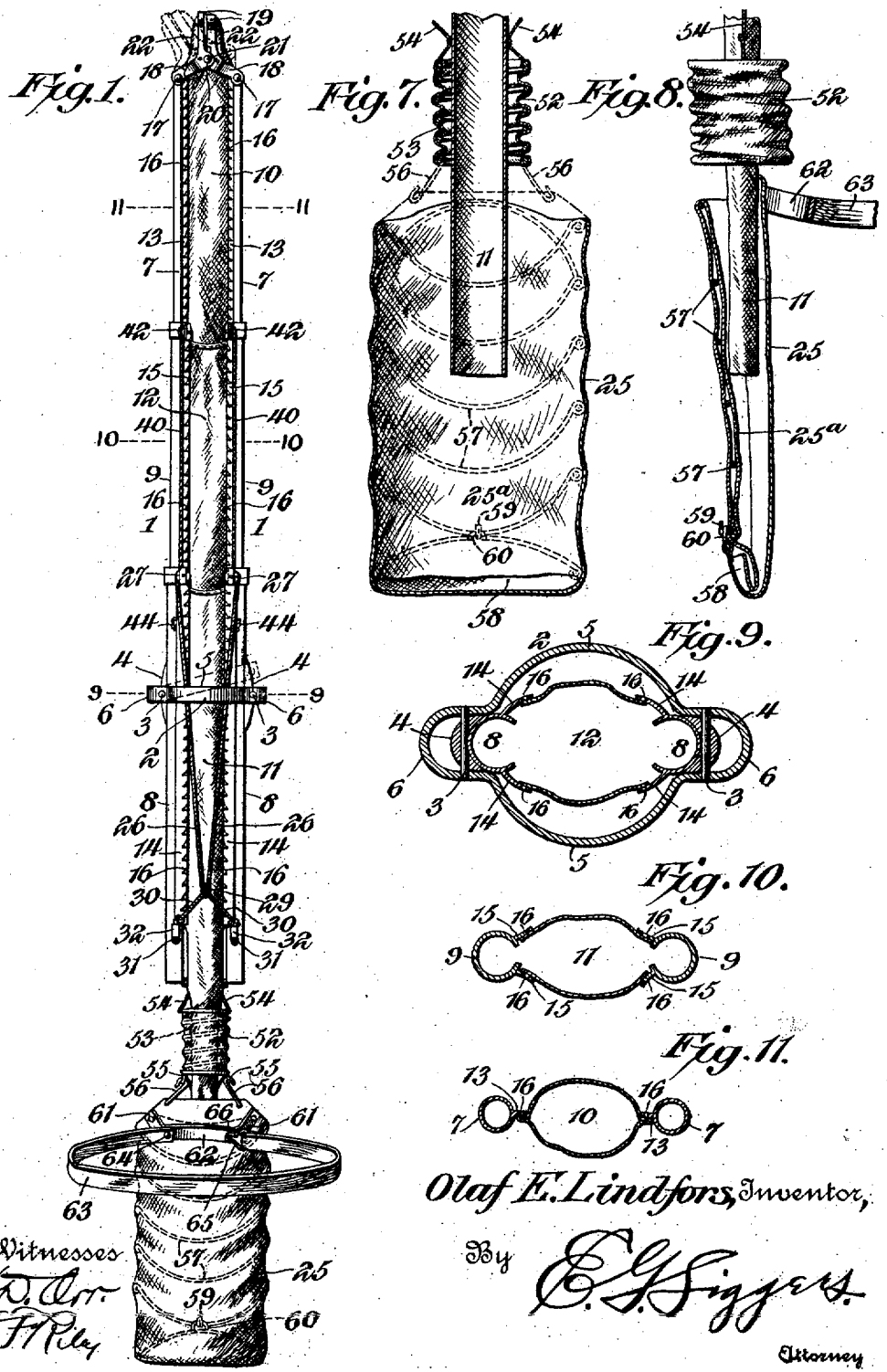

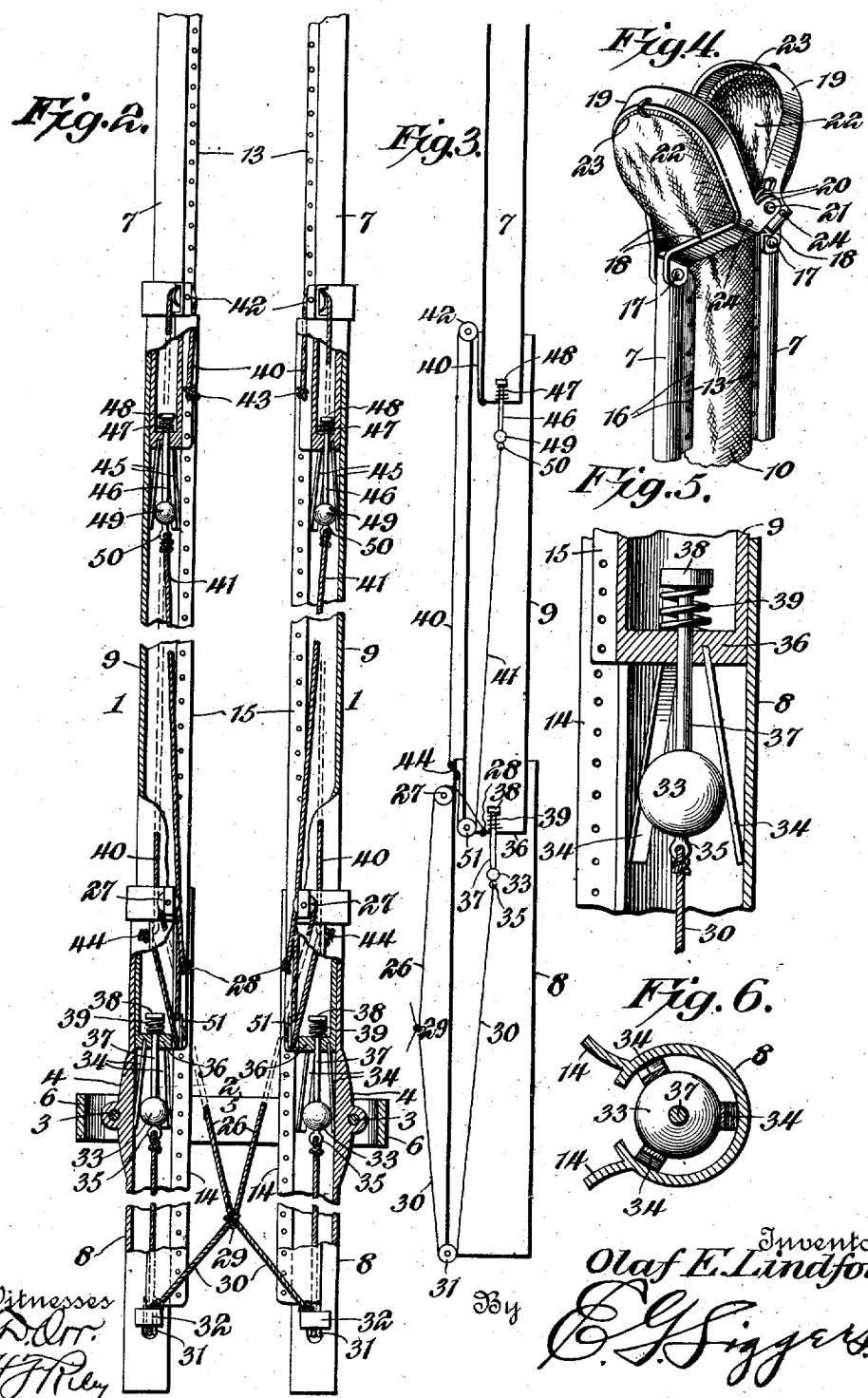

OLAF E. LINDFORS, OF FRUITA, COLORADO.

FRUIT-PICKER.

No. 857,475.          Specification of Letters Patent.          Patented June 18, 1907.

Application filed March 21, 1906. Serial No. 307,226.

*To all whom it may concern:*

Be it known that I, OLAF E. LINDFORS, a subject of the King of Sweden, residing at Fruita, in the county of Mesa and State of Colorado, have invented a new and useful Fruit-Picker, of which the following is a specification.

The invention relates to improvements in fruit pickers.

The object of the present is to improve the construction of fruit pickers, and to provide a simple, and comparatively inexpensive fruit picker capable of enabling fruit to be picked with greater ease and rapidity than heretofore, and adapted to control the descent of the fruit from a tree to a receptacle, whereby the fruit is prevented from being bruised, or otherwise injured, by falling through the device.

A further object of the invention is to provide an extensible fruit picker, adapted to be quickly varied in length, whereby fruit may be readily gathered from any portion of a tree.

Another object of the invention is to provide a fruit picker having cutting mechanism for severing the stems of the fruit, and provided also with operating means adapted to actuate the cutting mechanism, and capable of changing the position of the same to enable the cutting mechanism to operate more effectively.

With these and other objects in view, the invention consists in the construction and novel combination and arrangement of parts, hereinafter fully described, illustrated in the accompanying drawings, and pointed out in the claims, hereto appended.

In the drawings:—Figure 1 is an elevation of a fruit picker constructed in accordance with this invention. Fig. 2 is an enlarged longitudinal sectional view of a portion of the fruit picker, illustrating the arrangement of the means for operating the telescopic sections of the sides or members. Fig. 3 is a diagrammatic view, showing the arrangement of the flexible connections and the guide pulleys more clearly. Fig. 4 is an enlarged detail perspective view of the top portion of the fruit picker, illustrating the arrangement of the cutting mechanism for severing the stems of the fruit. Figs. 5 and 6 are enlarged detail sectional views, illustrating the construction of the locking devices for holding the telescopic sections in their adjustment. Figs. 7 and 8 are enlarged detail sectional views of the bag or receptacle and the lower portion of the chute Fig. 9 is an enlarged transverse sectional view on the line 9—9 of Fig. 1. Fig. 10 is an enlarged transverse sectional view on the line 10—10 of Fig. 1. Fig. 11 is an enlarged transverse sectional view on the line 11—11 of Fig. 1.

Like numerals of reference designate corresponding parts in all the figures of the drawings.

1, 1 designate two spaced sides or members, connected at an intermediate point by a yoke 2, and secured to the same by pivots 3, which pierce the sides of the yoke, and which are also arranged in suitable perforations of lugs or ears 4 of the sides or members. The yoke consists of a central circular portion 5, and end extensions 6, which are approximately U-shaped, as clearly shown in Fig. 9 of the drawings, and which receive the sides or members 1. The intermediate pivotal connection between the sides or members and the yoke, enable the former to operate as levers, and when their lower portions are swung outwardly, their upper portions will be swung inwardly to operate the cutting mechanism hereinafter described. The pivotal connection between the sides or members and the yoke also permits the said sides or members to be moved longitudinally in opposite directions for swinging the cutting mechanism from a central position to either side, one of the side positions of the cutting mechanism being illustrated in dotted lines in Fig. 1 of the drawings. This lateral movement of the cutting mechanism enables the same to operate more effectively on the fruit, which may be conveniently gathered from either side of a limb.

The sides or members consist of top, bottom, and intermediate tubular sections 7, 8 and 9, the intermediate section 9 being slidable in the bottom section 8, and the top section 7 being slidable in the intermediate section 9. The spaced sides or members 1 receive between them and support a chute, constructed of suitable fabric and consisting of top, bottom and intermediate sections 10, 11 and 12, which move into and out of each other with the sliding of the sections of the sides or members. The sections 10, 11 and 12 of the flexible chute, are secured to the sections 7, 8 and 9 of the sides or members, which are provided with perforated longitudinal flanges 13, 14 and 15. The sections of the chute are preferably stitched to the longitudinal flanges 13, 14 and 15, as indicated at 16 in the accompanying drawings, but they may be secured to the flanges in any other desired manner. The top sections 7 of the sides or members are provided at their inner sides with a single flange 13, which slides between the flanges 15, which are arranged in pairs at the inner sides of the intermediate sections 9. The flanges 14 of the bottom sections are also arranged in pairs, and are spread sufficiently to receive the flanges 15 of the intermediate sections 9, the flanges 15 being also spaced apart to admit of the sliding movement of the flange 13 of the top sections.

The upper or outer ends of the top sections are pivoted by rivets 17, or other suitable fastening devices, to arms 18 of a pair of jaws 19, which constitute cutting mechanism for severing the fruit from the trees. The jaws are approximately U-shaped, being provided with inner cutting edges, and having ears 20 located at the terminals of the U-shaped portions or jaws, and connected by suitable pivots 21. One of the jaws is beveled at its inner face to form the cutting edge, and the other jaw is beveled at the outer face, the cutting edges being contiguous and being adapted to pass each other in the closing movement of the jaws, whereby the stems are readily cut to sever the fruit from the trees. The arms 18, are arranged in pairs, and converge from the inner terminals of the jaws to the upper ends of the sides or members 1, and when the lower portions of the sides or members are swung outwardly, the jaws are opened. The jaws are closed by moving the lower portions of the sides or members inwardly toward each other.

The top section 10 of the chute is provided with opposite extensions 22, which are connected with the outer edges of the jaws, and which, when the jaws are closed, form a top receptacle or pocket for holding the fruit until after the same is severed from the tree. The extensions 22, which conform to the configuration of the cutting jaws, are secured at their edges to approximately U-shaped supports 23, consisting preferably of wire arches, secured at the top to their respective jaws and having terminal projections 24, which are secured in perforations of the jaws. When the jaws of the cutting mechanism are closed on the stem of the fruit to sever the same from a tree, the upper ends of the sides or members are spread, and stretch the sides of the upper portion of the chute sufficiently to prevent the fruit from dropping down the chute. The descent of the fruit is controlled by moving the upper portions of the sides or members inward sufficiently to permit the fruit to roll down the chute slowly. This will enable the fruit to be delivered into a bag or receptacle 25 without being bruised or otherwise injured.

Each top section 7 is automatically moved inwardly and outwardly when the intermediate section 9 is manually operated to move it in the same direction. Each intermediate section is moved outwardly by a flexible connection 26, consisting preferably of a cord constituting a hoisting connection, which is arranged on a guide pulley 27 at the top of the bottom section 8, and which has its end 28 secured to the intermediate section 9 at the lower end thereof. The guide pulley 27 is supported in a suitable casing, and it will be clear that by pulling upon the lower portion or operating part of the flexible connection 26, the intermediate section 9 will be moved upwardly or outwardly. The flexible connections 26 of the two sides or members are connected together at 29 and are simultaneously operable. Each bottom section is also provided with a flexible connection 30, consisting preferably of a cord and constituting a lowering connection, which passes under a guide pulley 31, which is mounted on the bottom section 8 at the lower portion thereof, preferably in a slot or opening, a suitable guard 32 being arranged over the opening, as clearly shown in Fig. 2 of the drawings. The flexible connection 30 extends upwardly from the guide pulley 31, and is connected with the lower end of the intermediate section through a spring actuated spreading member 33 of the locking device. The locking device, which is adapted to hold the intermediate section at any adjustment, is provided with a plurality of gripping springs or jaws 34, which are secured at their upper ends to the lower end of the intermediate section 9, and which diverge downwardly therefrom. The springs 34, which form resilient gripping jaws, frictionally engage the bottom section 8, and are maintained positively in such engagement by the said spring actuated spreading member 33.

The spring actuated spreading member consists of a rod or stem, provided near its lower end with a ball-shaped head, and having a lower eye 35, to which the flexible connection 30 is secured. The intermediate section is provided at its lower end with a wall 36, through which the rod or stem 37 extends. The upper end of the rod or stem 37 is provided with a head 38, and a coiled spring 39 is interposed between the head and the upper face of the end wall 36, being disposed on the upper portion of the rod or stem, as shown. The spring is adapted to move the spreading member upwardly automatically into engagement with the gripping member or jaws of the locking device when the said spreading member is free to move. By this construction, the gripping member or jaws are maintained in positive frictional engagement with the lower section 8, but when the flexible connection 30 is pulled upon, the spreading member is moved downwardly to carry its head out of engagement with the gripping member or jaws, and this downward movement also draws the intermediate section downwardly or inwardly. The outer ends of the flexible connections 30 are attached to the hoisting flexible connections 26 at 29, and when one set of flexible connections is operated, the other will be permitted to move in the opposite direction, so as not to interfere with the sliding of the telescopic sections on each other.

The top section 7 of each side or member is automatically operated by means of a flexible hoisting connection 40 and a flexible lowering connection 41. The flexible connection 40 is arranged on a guide pulley 42, which is mounted on the intermediate section at the upper end thereof in a suitable bracket or casing. The end 43 of the flexible connection 40 is secured to the top section 7 near the lower end thereof, and the said flexible connection extends upward from such point of attachment and passes over the said pulley 42, and extends downward to the bottom section, to which it is secured at the upper portion thereof at 44. It will be seen that by this arrangement the top section will be automatically moved upwardly or outwardly when the intermediate section is raised, as the upward movement of the intermediate section will carry the pulley 42 upward and thereby raise the top section 7.

The top section is secured in its adjustment by a locking device, constructed like that heretofore described, and consisting of a plurality of gripping jaws 45 and a spring actuated spreading member 46. The gripping members or jaws 45 depend from the lower end of the top section 7, and the spring actuated member 46 has a rod or stem, which is slidable through the lower end of the said section 7. A coiled spring 47 is interposed between the lower end of the top section 7, and a head 48 of the upper end of the rod or stem. The gripping jaws or members are supported by a ball-shaped head 49, and the flexible connection 41 is secured to an eye 50, located at the bottom of the ball. The flexible connection 41 extends downward to a guide pulley 51, which is carried by the intermediate section at the lower end thereof. The guide pulley 51 is mounted in a suitable bracket or casing, and the flexible connection 41 extends upward from the guide pulley 51, and is secured at 44 to the bottom section 8, at the upper portion thereof. The flexible connections for raising and lowering the top section 7, may consist of a continuous cord knotted at 44 to form a stop, or separate pieces may be employed as desired. When the intermediate section is manually moved downwardly, it carries with it the guide pulley 51, which pulls the flexible connection 41 downwardly, thereby disengaging the ball head 49 from the gripping members or jaws and drawing the top section 7 downwardly.

The bottom section 11 of the chute depends below the sides or members 1, and extends into the bag or receptacle 25, and the said bottom section 11 is yieldably connected with the bag or receptacle by an extensible tubular member, consisting of a fabric sleeve 52, normally held in a contracted condition by a coiled spring 53, and adapted to be extended to permit a free movement of the sides or members toward and from the bag or receptacle while picking the fruit. The upper end of the extensible tubular member is connected with the bottom section 11, at the lower ends of the sides or members, by short cords 54, and the lower end of the extensible tubular member is provided with opposite eyes 55, which are engaged by links 56, extending upwardly from the top of the bag or receptacle, as clearly shown in Fig. 1 of the drawings. The extensible connection also assists in cushioning the fruit, while the same is passing through the bottom section of the chute into the bag or receptacle.

The fruit is cushioned within the bag or receptacle by a plurality of curved springs 57, which stretch the bag or receptacle transversely, and thereby draw the sides together. These springs, with the exception of the lowermost one, are at one side of the bag or receptacle, the side having the springs being provided with an interior lining $25^a$, for preventing the fruit from coming in contact with the springs. The top spring is curved upwardly, and the bottom spring is also arranged in a similar position when the bag is closed, as hereinafter explained. The intermediate springs are curved downwardly, and the terminals of each of the springs are provided with eyes for enabling the springs to be stitched to the bag or receptacle. As the bag or receptacle fills, the springs are bowed. The bag or receptacle is provided at its lower end with an opening 58, for enabling its contents to be readily discharged from it. In order to enable the lower end of the bag or receptacle to be maintained in a closed condition while gathering fruit, the bag or receptacle is provided at one side with a hook 59, which is adapted to be engaged by an eye 60, arranged at the lower edge of the opposite side of the bag or receptacle, and preferably formed by coiling the wire of which the lowermost spring is constructed. The lower end of the bag or receptacle is readily opened by unhooking the eye.

The upper portion of the bag or receptacle is secured to a pair of arms 61 of a supporting bar 62, having a curved intermediate portion to fit the body of the operator. The terminals of the bar diverge from the intermediate portion to form the said arms 61, and the said bar is secured to the body of the wearer by means of a strap 63, permanently secured at one end to the supporting bar at the inner end of one of the arms 61 by a rivet or other suitable fastening device, as shown at 64. The other end of the strap is provided with a loop 65, having a contracted portion for engaging a headed projection 66 of the supporting bar. Any other suitable means, however, may be employed for connecting the free end of the strap with the supporting bar.

Having thus fully described my invention, what I claim as new and desire to secure by Letters Patent, is:—

1. A fruit picker comprising two spaced sides or members, a chute arranged between the sides or members throughout the entire length thereof and supported by the said sides or members, and cutting mechanism also supported by the sides or members.

2. A fruit picker comprising two spaced sides or members movably connected, a flexible chute arranged between and supported by the sides or members throughout the entire length thereof, and cutting mechanism operated by the said sides or members.

3. A fruit picker comprising two sides or members spaced apart throughout their entire length, a flexible chute mounted within the space between the sides or members and having its sides connected with the said sides or members, cutting mechanism connected with the sides or members, said sides or members being movable toward and from each other to stretch the chute, and thereby control the passage of the fruit through the same and also to operate the cutting mechanism.

4. A fruit picker comprising cutting mechanism, spaced sides or members, each being pivotally connected with the cutting mechanism, and connecting means pivoted to each of the sides or members and permitting the same to move longitudinally and transversely for operating the cutting mechanism and for also moving the same laterally of the fruit picker.

5. A fruit picker comprising two sides or members spaced apart throughout their entire length, cutting mechanism pivoted to the outer ends of each of the sides or members and spacing the outer ends of the same, connecting means pivoted to and spacing the sides or members, said sides or members being movable toward and from each other and also longitudinally in opposite directions, whereby the sides or members are adapted to operate the cutting mechanism and are also capable of changing the positions of the cutting mechanism, and a flexible chute mounted within the space between the sides or members and arranged to be contracted by the same to control the passage of fruit through the said chute.

6. A fruit picker comprising cutting mechanism having pivoted jaws and provided with arms, spaced sides or members, each pivoted at its outer end to one of the arms, connecting means pivoted to the sides or members and spaced from the cutting mechanism, and a chute arranged between the said sides or members and extending from the cutting mechanism.

7. A fruit picker comprising cutting mechanism having pivoted jaws and provided with arms, spaced sides or members, each pivoted at its outer end to one of the arms, connecting means pivoted to the sides or members at a point between the ends thereof, the inner or lower portions of the sides or members forming handles for operating the fruit picker, and a chute arranged between the sides or members and extending from the cutting mechanism.

8. A fruit picker comprising cutting mechanism having pivoted jaws provided with arms, movably mounted sides or members pivotally connected with the arms for operating the cutting mechanism, and a chute supported by the sides or members.

9. A fruit picker comprising cutting mechanism having pivoted jaws and provided with arms, sides or members connected at their upper or outer ends with said arms, connecting means pivoted to the sides or members and a flexible chute arranged between and connected with the sides or members, said sides or members being movable toward and from each other to operate the cutting mechanism and also to stretch the chute to control the passage of the fruit therethrough.

10. A fruit picker comprising pivoted jaws, spaced sides or members connected with and adapted to operate the jaws, and a chute arranged between and supported by the sides or members and having extensions connected with the jaws and arranged to form a pocket or receptacle.

11. A fruit picker comprising pivoted jaws, spaced sides or members movable toward and from each other for operating the jaws, a flexible chute connected with the sides or members and with the jaws, said sides or members being movable outwardly to simultaneously stretch the chute and close the jaws.

12. A fruit picker comprising cutting mechanism having pivoted jaws, spaced sides or members pivotally connected with the cutting mechanism for operating the jaws, and a connecting device pivoted to each of the sides or members at an intermediate point and permitting the same to move longitudinally, whereby the cutting mechanism is moved bodily in a direction lateral of the fruit picker.

13. A fruit picker comprising cutting mechanism, spaced sides or members movably connected with the cutting mechanism for operating the same, a chute arranged between the sides or members and supported thereby, and a yoke receiving the sides or members and connected with the same and also surrounding the chute.

14. A fruit picker comprising cutting mechanism, spaced sides or members composed of extensible sections, said sides or members serving as operating means for the cutting mechanism, and a chute arranged between the sides or members and composed of sections connected with the first mentioned sections throughout the entire length of the same.

15. A fruit picker comprising spaced sides or members composed of extensible telescopic sections, cutting mechanism operated by the said sides or members, and a flexible chute arranged between the said sides or members and composed of sections movable into and out of each other, the sections of the chute being connected with the first mentioned sections throughout the entire length of the same.

16. A fruit picker comprising means for severing the fruit, a chute, and spaced sides or members supporting the chute throughout their entire length, said sides or members being provided with extensible sections, some of the sections being manually operable and other sections being automatically operable.

17. A fruit picker provided with supporting means having extensible sections, a locking device for holding the sections in their adjustment, and hoisting means for extending the sections, and means for moving the sections inwardly, the latter means being also connected with the locking device for automatically releasing the sections.

18. In a fruit picker, the combination of spaced sides or members, each composed of top, bottom, and intermediate sections, a chute arranged between and supported by the sides or members, means carried by the sides or members for picking the fruit, manually operated hoisting connections mounted on the bottom sections of the sides or members and connected with the intermediate sections for raising the same, flexible connections also mounted on the bottom sections and extending in opposite directions from the hoisting connections and connected with the intermediate sections for lowering the same, and separate automatically operable means for simultaneously raising and lowering the top sections.

19. In a fruit picker, the combination of spaced sides or members, an intermediate chute carried by the sides or members, cutting mechanism also supported by the sides or members, a receptacle receiving the lower portion of the chute, and a resilient extensible tubular connection attached to the chute and to the receptacle.

20. In a fruit picker, the combination of spaced sides or members, an intermediate chute carried by the sides or members, cutting mechanism also supported by the sides or members, a receptacle receiving the lower end of the chute, and a tubular connection between the chute and the receptacle, said tubular connection being extensible to permit the sides or members and the parts supported thereby to be moved toward and from the receptacle.

21. In a fruit picker, the combination of spaced sides or members, an intermediate chute carried by the sides or members, cutting mechanism also supported by the sides or members, a receptacle receiving the lower end of the chute, and a tubular connection encircling the chute and attached to the same and to the receptacle and having an extensible coiled spring normally retaining the tubular connection in a contracted condition.

In testimony, that I claim the foregoing as my own, I have hereto affixed my signature in the presence of two witnesses.

OLAF E. LINDFORS.

Witnesses:
E. A. LOOMIS,
O. D. BETTS.